United States Patent Office 2,719,180
Patented Sept. 27, 1955

2,719,180

SEPARATION OF ALCOHOLS FROM A CARBON-MONOXIDE HYDROGENATION PRODUCT

Walter Rottig, Oberhausen-Sterkrade-Nord, Germany, assignor to Ruhrchemie Aktiengesellschaft, Oberhausen-Holten, Germany, a corporation of Germany No Drawing. Application March 10, 1951,
Serial No. 215,009

Claims priority, application Germany March 13, 1950

3 Claims. (Cl. 260—643)

This invention relates to improvements in the separation of alcohols from mixtures with other organic compounds. It relates particularly to the separation of alcohols out of the products formed during the catalytic hydrogenation of carbon monoxide.

As is known, products containing larger or smaller amounts of oxygenous compounds, mostly in the form of higher aliphatic alcohols, may be formed during carbon monoxide hydrogenation depending upon the type of catalyst used and the conditions under which the reaction takes place. Cobalt catalysts produce comparatively small amounts of these oxygenous compounds, while iron catalysts form considerably larger amounts. The products formed by the catalytic addition of water gas to unsaturated hydrocarbons with subsequent hydrogenation also consist of higher alcohols to a considerable degree.

Several processes are known for the separation of these highly valuable alcohols from the other products.

In one known method the alcohols are esterified with boric acid, and the other organic compounds, especially the hydrocarbons, are separated from the formed boric acid esters by distillation. This may be effected without any difficulty due to the fact that boric acid esters have a considerably higher boiling point than the other organic compounds. This esterification with boric acid has not proved entirely satisfactory, however, due to the fact that corrosion proof apparatus is required. The use of this corrosion proof apparatus makes the cost of installation high. Another disadvantage in this procedure lies in that occasionally fairly large quantities of alcohol are lost due to the fact that boric acid tends to dehydrate the alcohols into olefines, and the boric acid esters, at high temperatures, frequently tend to disintegrate.

The alcohols may also be separated from the hydrocarbons and other organic compounds by azeotropic distillation. With low boiling point alcohols, such a distillation can be carried out comparatively easily. When higher temperatures are required, e. g. above 160° C., difficulties are encountered, because the azeotropes form binary mixtures not only with the hydrocarbons, but also with the alcohols which are to be isolated. Due to this a faultless separation into hydrocarbons and alcohols becomes difficult and at times, even entirely impossible.

The separation of alcohols from the other ingredients of the reaction products formed by the carbon monoxide hydrogenation may also be effected with the use of selected solvents, as for example, by hydrous methyl alcohol or hydrous ethyl alcohol. However, it has never proven technically possible to obtain a purity of the alcohols which is satisfactory for all industrial purposes, because due to a displacement of the solubility equilibrium during the extraction fairly large quantities of hydrocarbons are simultaneously separated out with the alcohols. A separation method has also been proposed whereby the separation of the alcohols from the hydrocarbon mixtures is effected by fractional adsorption with activated substances, such as aluminum oxide, silica gel, and activated carbon. This method of separation is premised on the known fact that the alcohols are usually quickly adsorbed by these substances. However, in practice these installations have a low efficiency, so that the cost of production is high. Due to a simultaneous adsorption of the hydrocarbons, it is generally not possible to practically obtain a sufficient purity of the alcohols in this way.

One object of this invention is the separation of alcohols from mixtures of organic compounds containing alcohol, such as are obtained from carbon monoxide hydrogenation. This and further objects will become apparent from the following description.

It has now been found that the alcohols may be separated from the other components of alcohol containing mixtures, such as the products of catalytic hydrogenation of carbon monoxide, in a surprisingly easy and simple manner if the alcohols to be isolated are first converted by reacting with added aldehydes and a media capable to form an azeotropic mixture, into acetals within the mixture. The acetals formed are then isolated by distilling off the other components of the mixture and then split by saponification into pure alcohols and aldehydes which were originally used for the formation of the acetals, and finally separated by distillation. As the aldehyde component it is possible to use, according to the invention, any of numerous aliphatic aldehydes, such as for example propionaldehyde, butyraldehyde or aromatic aldehydes, such as benzaldehyde and heterocyclic aldehydes as for example furfuraldehyde (furfurol). The kind of aldehyde used depends to a certain degree upon the alcohols which are to be isolated. In many cases, however, the use of propionaldehyde is especially suitable.

To facilitate the splitting off of water, anhydrous salts and preferably anhydrous copper sulfate may be added to the reaction mixture. A splitting off of water out of the reaction precipitants which are to be condensed with each other may be done with p-toluolsulfonic acid. According to the invention the use of very small quantities of concentrated hydrochloric acid has proven particularly advantageous. In this respect, because the water, which is distilled off in the reaction, carries the hydrochloric acid along with it so that a practically acid free reaction product remains. It is also possible to work with small quantities of gaseous hydrogen chloride. Generally from 0.1 to 1.0% by volume of concentrated hydrochloric acid relative to the total reaction mixture, is sufficient.

In processing the products of catalytic carbon monoxide hydrogenation it has been found advisable to separate the products into single fractions by distillation prior to any further treatment. The separation should be effected in such a manner that the boiling point of the acetal with the lowest boiling point is at least 20° and preferably 50° higher than the boiling point of the hydrocarbon of the highest boiling point. It is preferable that separation be effected in any of three temperature ranges, i. e. in fractions from 30–220° C. and 220–320° C. and 320–380° C. Besides these ranges there is the remains which boils above 380° C. In all these fractions the process, according to the invention, may be applied in basically the same manner.

The fraction which for example boils between 220–320° C. contains alcohols with 10–15 carbon atoms and hydrocarbons with 13–18 carbon atoms. First of all the number of hydroxyls in this mixture is determined and from this number the approximate alcohol content is calculated. After this the fraction which boils between 220–320° C. is diluted with about 15–25% by volume of a C5-hydrocarbon. Other hydrocarbons having low boiling points may be used in place of this C5-hydrocarbon. An aldehyde, such as propionaldehyde, is then added in excess of the stoichiometric quantity required on the basis of the number of hydroxyls. Finally, a dehydrating medium, preferably the above mentioned amount of hydrochloric acid, is added to the reaction mixture. After the addition of the acid, the mixture is heated in a still to the boiling point. In this process the added $C_5$-hydrocarbon, the split off reaction water and a small part of the added aldehyde distill over at the extremely low temperature of 30–40° C. The steam is condensed in a cooler and the whole condensate is allowed to flow into a separator where a separation takes place in two phases. The upper layer consists chiefly of $C_5$-hydrocarbons and small amounts of aldehydes. This phase may be recirculated immediately. The lower layer contains the generated reaction water in which the entire amount of the hydrochloric acid gradually collects. The acidified water may be removed from the separator continuously or intermittently.

The completition of the acetal formation may be recognized by the fact that no more water distills over. In principle it is possible to remove the reaction water of the acetal formation by azeotropic distillation without using a media capable of splitting off the water (condensation media), e. g. hydrochloric acid. However, in practice this would cause an extraordinary prolongation of the reaction up to five times the time actually needed. In view of this prolongation it is of decided advantage to add the stated amount of the condensation media, e. g. hydrochloric acid.

After completion of the acetal formation, the heating of the reaction mixture is continued in the same still. In this operation the added low boiling point hydrocarbon and the excess aldehyde distill over first at a temperature of between 30–50° C. It should be noted that this mixture may be recirculated immediately and thus special separation is not required so that the distillation may be carried out without a fractionating attachment.

After the separation of the $C_5$-hydrocarbons, the residue of the distillation consists of acetals, hydrocarbons and possibly some other organic oxygen containing compounds. This residue is separated from the formed acetals in a vacuum distilling apparatus, using a fractionating column at a pressure of 5–10 mm. Hg. If the boiling point is low, a lesser vacuum will be sufficient. If the boiling point is higher, the vacuum must be increased to 1–2 mm. Hg.

In the fraction with the boiling point between 220–320° C. hydrocarbons of $C_{12}$–$C_{18}$ and alcohols of $C_{10}$–$C_{15}$ are present. In this case the lowest acetal formed has a molecular size of $C_{23}$ if propionaldehyde is used. The difference between the boiling points of the highest hydrocarbon ($C_{18}$) and the lowest acetal ($C_{23}$) is so high that the quantitative separation of the hydrocarbons presents no difficulties.

To protect the reaction products it is advantageous in some cases to remove the hydrocarbons by azeotropic distillation. When proceeding in this manner glycol or its homologues, i. e. butanediol or diethyline-glycol are used as azeotropes. By proceeding in this manner of operation when using great care, a separation of the hydrocarbons from the residual acetals may be effected with a vacuum of 5–10 mm. Hg at a temperature of between 95–110° C.

After separation of the hydrocarbons and the other organic compounds, the residual acetals are resaponified. This saponification may be effected in the same apparatus as is used for the formation of the acetals. In almost all cases hot water with the admixture of some steam, if necessary, will be sufficient for the saponification. In a very few cases the addition of very small amounts of acid, e. g. of hydrochloric acid or p-toluolsulfonic acid to the extent of 0.01–0.1% by volume may be advantageous. In this process the alcohols are formed again from the acetals while the split off aldehydes are distilled out and after condensation are returned for reuse. The saponification of the acetals may be also carried out continuously. For this purpose acetals are conducted into the lower end of a pipe filled with hot water at a temperature of about 70–80° C. The re-formed aldehyde, such as propionaldehydes, then distills off continuously from the upper end of the water column while the alcohols form as the uppermost fluid layer and can be drawn off continuously. The excess water is separated from the alcohol mixture obtained by the saponification. Thereafter it is possible to obtain various alcohols with a purity of practically 100% in the known manner, e. g. through vacuum distillation. The other mentioned fractions of the products of catalytic carbon monoxide hydrogenation may be processed in a mannei analogous to the manner of operation described above for the fractions which boil between 220–320° C.

The following examples are given by way of illustration and not limitation, the invention being limited by the appended claims or their equivalents.

*Example 1*

A fraction boiling between 220–230°, was separated from a mixture of synthetic hydrocarbons obtained with iron catalysts, which contained considerable amounts of oxygenous compounds, especially alcohols. Of this fraction, which, according to the number of hydroxyls, contained 35% of alcohols, 7300 cc. were mixed with 1250 cc. of a $C_5$-hydrocarbon fraction, 620 cc. of propionaldehyde and 20 cc. of aqueous hydrochloric acid. This mixture was heated slowly in a still whereupon, at about 35° C., a mixture of $C_5$-hydrocarbon, water and some propionaldehyde distilled off. The steam and vapors passing over were condensed and conducted into a separator for separation of the layers. The $C_5$-fraction, which formed the upper layer and contained some propionaldehyde, was led back into the reaction vessel. The lower layer consisted of water containing hydrochloric acid and was continuously drawn off. A total of 100 cc. of water distilled over.

Immediately afterwards, the $C_5$-hydrocarbon with small amounts of the excess propionaldehyde was distilled off in the same still. This distillate was immediately used for the formation of new acetals within the framework of the process according to the invention. The rest of the reaction mixture consisted of hydrocarbons, acetals and other organic compounds and was led over into a vacuum distillation column.

Under a pressure of 5 mm. Hg and at temperatures between 100–150°, the hydrocarbons and the other organic compounds were separated from the mixture of acetals which remained as the residue of the distillation.

When the butanediol was used to form the azeotropic mixture the vacuum could be maintained at 10 mm. Hg and the distillation temperatures could be lowered to 80–120°.

The residual acetal mixture was mixed with 1000 cc. of water in the still used at the start and was heated. At a maximum temperature of 51°, a total of 600 cc. of propionaldehyde distilled over. A mixture of alcohols and added water remained in the still. The various alcohols in it were isolated by vacuum distillation at a pressure of 10 mm. Hg.

*Example 2*

6000 gms. of primary fraction boiling between 90° C. and 160° C. and containing approximately 60% alcohols (the fraction being derived from the primary product of a carbon monoxide hydrogenation over iron catalysts with the preferred formation of oxygen-containing compounds), were admixed with 2000 gms. benzaldehyde and 1000 cm.³ of a $C_5$ fraction and 25.5 cm.³ concentrated hydrochloric acid, the latter being added in three portions of each 8.5 cm.³. The mixture was brought to a slight boil, thereby distilling off an azeotropic mixture which, after condensation, separated into two layers. The lower layer, which gradually contained all of the hydrochloric acid, was continuously drawn off. The total yield of water was 320 cm.³.

The product was subsequently freed by way of distillation from the low boiling hydrocarbons of the molecular size $C_7$–$C_9$, whereby also the other oxygen-containing compounds, for example small amounts of ketones, esters, and acids, distilled off.

The residuum of the above mentioned distillation was subsequently admixed with 350 cm.³ of water and 10 cm.³ of hydrochloric acid and heated to 100° C. for half an hour. Herewith the reconversion of the previously formed acetals into alcohols and benzaldehyde occurred. After separation of the excess aqueous layer, the remaining mixture consisting of little $C_3$, chiefly $C_4$, $C_5$ and little $C_6$ alcohol and benzaldehyde was fractionated at normal pressure. In addition to small first runnings of aqueous propanol and aqueous butanol the other alcohols could be recovered directly in 97 to 98% purity. The benzaldehyde remaining in the residuum was conducted into a new acetalization.

*Example 3*

1500 gms. of a fraction boiling between 180° and 320° C. and containing 45% alcohols, which fraction was derived from a carbon monoxide hydrogenation over iron catalysts with the preferred formation of oxygen-containing compounds, were admixed with 350 cm.³ benzene, 210 gms. butyric aldehyde and 10 cm.³ HCl, the latter being added in two portions. The mixture was heated until it was boiling, thereby distilling off an azeotropic mixture which, after total cooling, separated into two layers. The lower, aqueous layer was continuously drawn off. It contained finally almost all of the added hydrochloric acid. The quantity was 47 cm.³. After having distilled off the excess butyric aldehyde and the benzene, the residuum was fractionated at a pressure of 20 mm. Hg, whereby the originally present proportion of hydrocarbons and small quantities of esters, ketones and acids distilled off. This quantity was 830 gms.

The residuum was heated, while adding 75 cm.³ of water and 10 cm.³ of hydrochloric acid, and maintained boiling for half an hour, the re-converting butyric aldehyde being continuously drawn off at the top of the column. When the distillation was finished, the excess water was separated and the residuum was fractionated first at a pressure of 10 mm. Hg and finally at a pressure of 2 mm. Hg. The resulting alcohols with a C-number between 7 and 15 were of a purity of 95% to 99%.

I claim:

1. Method for the separation of higher primary alcohols from a carbon monoxide hydrogenation product containing the same in admixture with hydrocarbons thereof which comprises maintaining such product, in admixture with a stoichiometric excess, based on said alcohols, of an aldehyde of at least 3 C atoms, a condensing agent, and a low boiling point hydrocarbon forming an azeotropic mixture with water, at boiling temperatures to thereby distill off an azeotropic mixture of water and said low boiling point hydrocarbon, continuing boiling temperatures substantially until no further water distills over, separating the acetals from the non-acetal components of the still residue, saponifying the acetals and separating the resulting alcohols.

2. Method according to claim 1 in which a sufficient amount of said low boiling hydrocarbons is present to form an azeotropic mixture with substantially all of the water of reaction generated in the formation of said acetals and in which said low boiling hydrocarbon is a member of the group consisting of a $C_5$ hydrocarbon fraction and benzene.

3. Method according to claim 2 in which said low boiling point hydrocarbon is present to the extent of about 15 to 25% by volume of the total original mixture.

References Cited in the file of this patent

UNITED STATES PATENTS

| Number | Name | Date |
|---|---|---|
| 1,907,822 | James | May 9, 1933 |
| 2,307,937 | Marvel | Jan. 12, 1943 |
| 2,337,059 | Mikeska et al. | Dec. 21, 1943 |
| 2,360,685 | Jensen | Oct. 17, 1944 |
| 2,535,458 | Robeson | Dec. 26, 1950 |
| 2,537,169 | Stautzenberger et al. | Jan. 9, 1951 |
| 2,673,222 | McAteer et al. | Mar. 23, 1954 |

OTHER REFERENCES

Cromeans, abstract of Appl. Ser. No. 43,202 (filed Aug. 9, 1948), abstract published Nov. 20, 1951, 652 O. G. 891–2.